US008175873B2

(12) United States Patent
Di Fabbrizio et al.

(10) Patent No.: US 8,175,873 B2
(45) Date of Patent: May 8, 2012

(54) SYSTEM AND METHOD FOR REFERRING TO ENTITIES IN A DISCOURSE DOMAIN

(75) Inventors: Giuseppe Di Fabbrizio, Florham Park, NJ (US); Srinivas Bangalore, Morristown, NJ (US); Amanda Stent, Chatham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 755 days.

(21) Appl. No.: 12/333,863

(22) Filed: Dec. 12, 2008

(65) Prior Publication Data

US 2010/0153105 A1    Jun. 17, 2010

(51) Int. Cl.
    G10L 21/06    (2006.01)
    G10L 15/26    (2006.01)
(52) U.S. Cl. ..................................................... 704/235
(58) Field of Classification Search .................... 704/235
    See application file for complete search history.

(56) References Cited

U.S. PATENT DOCUMENTS

| 7,152,029 | B2* | 12/2006 | Alshawi et al. | 704/1 |
| 7,328,157 | B1* | 2/2008 | Chu et al. | 704/260 |
| 2010/0104086 | A1* | 4/2010 | Park | 379/265.09 |

OTHER PUBLICATIONS

Van Deemter, K., van der Sluis, I. & Gatt, A. (2006). Building a semantically transparent corpus for the generation of referring expressions. Proceedings of the 4th International Conference on Natural Language Generation (Special Session on Data Sharing and Evaluation), INLG-06.
Dale, R. & Reiter, E. (1995). Computational interpretations of the Gricean maxims in the generation of referring expressions. Cognitive Science, 19(2).
G. Di Fabbrizio, A. Stent and S. Bangalore. Trainable speaker-based referring expression generation. In *Proceedings of CONLL 2008*, 2008.
G. Di Fabbrizio, A. Stent and S. Bangalore. Referring expression generation using speaker-based attribute selection and trainable realization (ATT-REG). *In Proceedings of INLG 2008*, 2008.
S. Gupta and A. Stent. Automatic evaluation of referring expression generation using corpora. Proceedings of the Workshop on Using Corpora in Natural Language Generation, 2005.

\* cited by examiner

*Primary Examiner* — Susan McFadden

(57) ABSTRACT

Systems, methods, and non-transitory computer-readable media for referring to entities. The method includes receiving domain-specific training data of sentences describing a target entity in a context, extracting a speaker history and a visual context from the training data, selecting attributes of the target entity based on at least one of the speaker history, the visual context, and speaker preferences, generating a text expression referring to the target entity based on at least one of the selected attributes, the speaker history, and the context, and outputting the generated text expression. The weighted finite-state automaton can represent partial orderings of word pairs in the domain-specific training data. The weighted finite-state automaton can be speaker specific or speaker independent. The weighted finite-state automaton can include a set of weighted partial orderings of the training data for each possible realization.

20 Claims, 5 Drawing Sheets

SYSTEM AND METHOD FOR REFERRING TO ENTITIES IN A DISCOURSE DOMAIN

BACKGROUND OF THE INVENTION

1. Field of the Invention

The present invention relates to generating natural language and more specifically to identifying objects in context in natural language.

2. Introduction

Natural language generation systems interface frequently with people in multi-modal communication. While current systems operate satisfactorily during most interactions with humans, one area of great difficulty is describing items in context in natural language. Natural language generation systems often operate in discourse environments where a number of entities are introduced into the environment shared by the reader/hearer and writer/speaker. For example, during a customer service system dialog with a user over a telephone, the dialog system determines it must show a user where a particular item is on a website, such as a link, form, or image. The typical dialog system encounters great difficulty conveying the location of the particular item on the website in well-formed linguistic expressions. Often the most recognizable and/or the most natural expressions refer to a position relative to the entire page or to other prominent elements. In other cases, the best expression refers to unique visual characteristics of the particular item. However, the typical dialog system does not properly or fully utilize this information, leading to choppy, confusing, malformed, or gibberish linguistic expressions. These poorly framed expressions can produce further recognition problems because of confused user input.

Accordingly, what is needed in the art is a generally applicable, robust, automated way to describe items in context in natural language.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for natural language generation. The method includes receiving domain-specific training data of sentences describing a target entity in a context, extracting a speaker history and a visual context from the training data, selecting attributes of the target entity based on at least one of the speaker history, the visual context, and speaker preferences, generating a text expression referring to the target entity based on at least one of the selected attributes, the speaker history, and the context, and outputting the generated text expression. The weighted finite-state automaton can represent partial orderings of word pairs in the domain-specific training data. The weighted finite-state automaton can be speaker specific or speaker independent. The weighted finite-state automaton can include a set of weighted partial orderings of the training data for each possible realization. In one aspect, the method further includes generating parsed word strings containing word pairs from the domain-specific training data.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
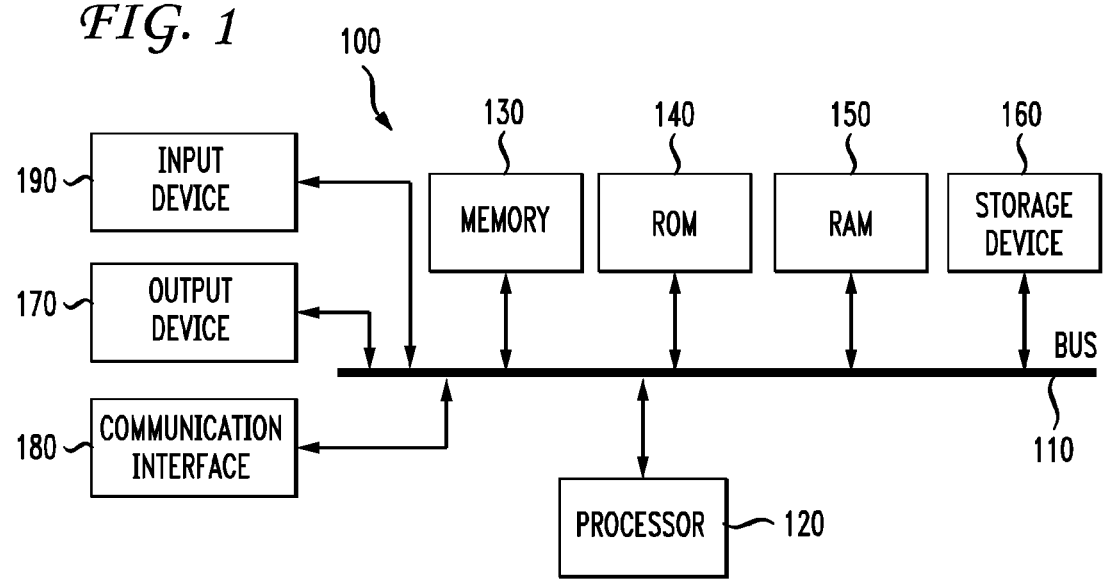
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
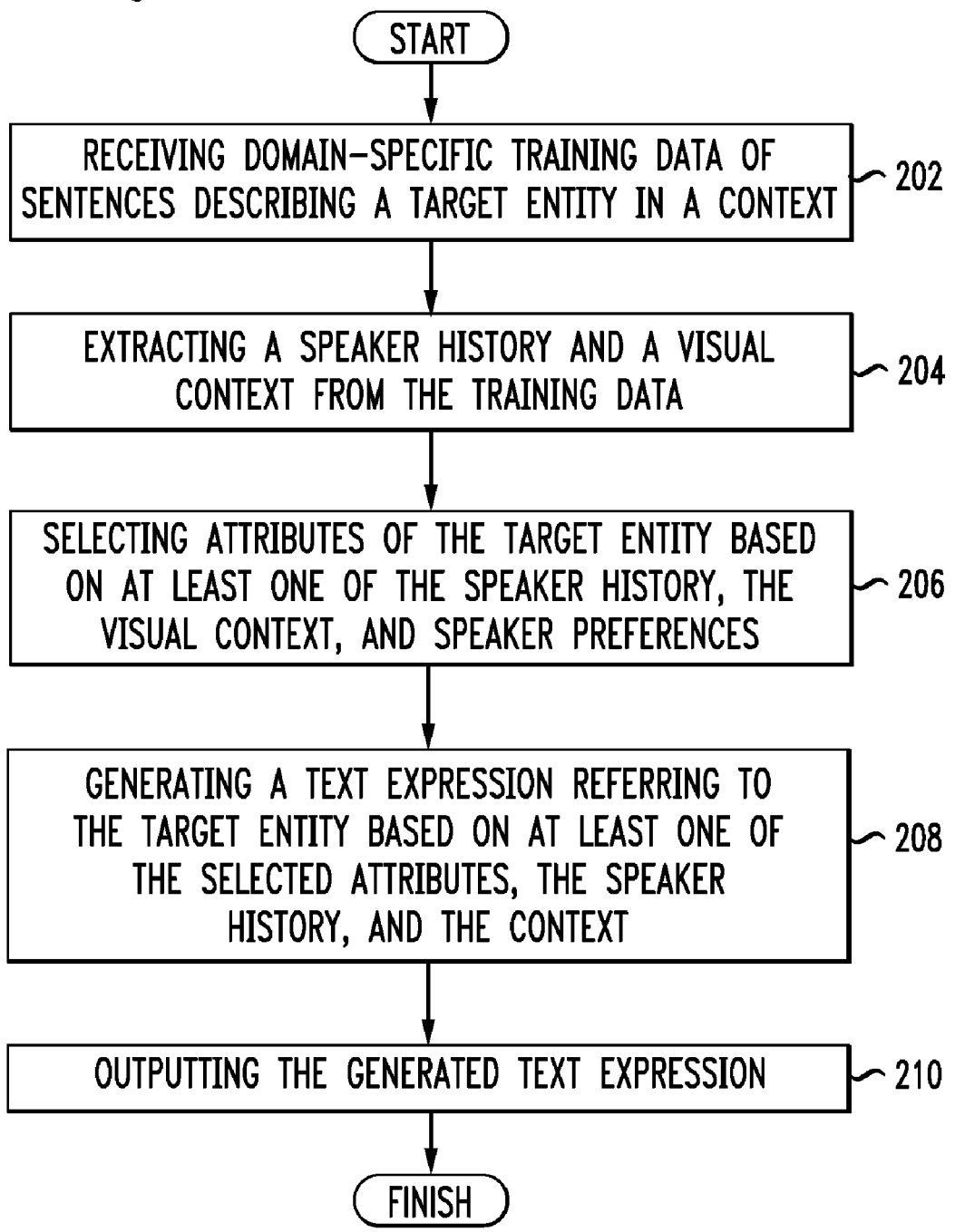
FIG. 2 illustrates an example method embodiment.
Figure 3:
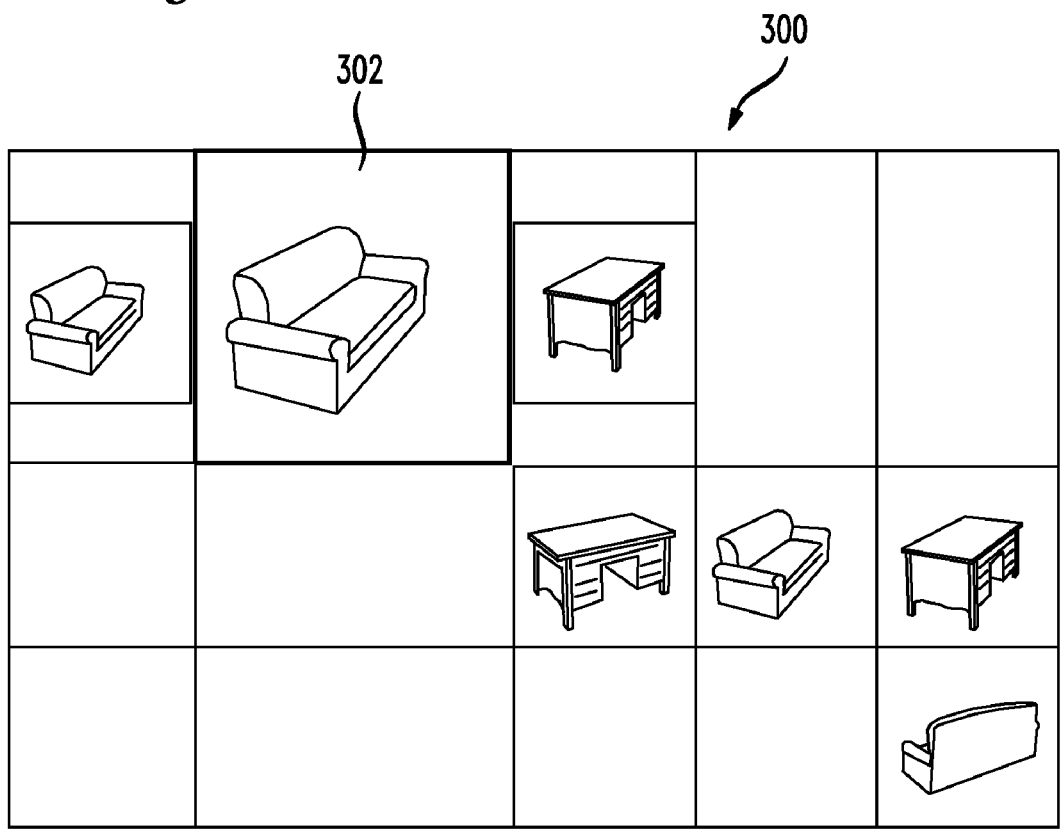
FIG. 3 illustrates an example of training data in a furniture domain.
Figure 4:
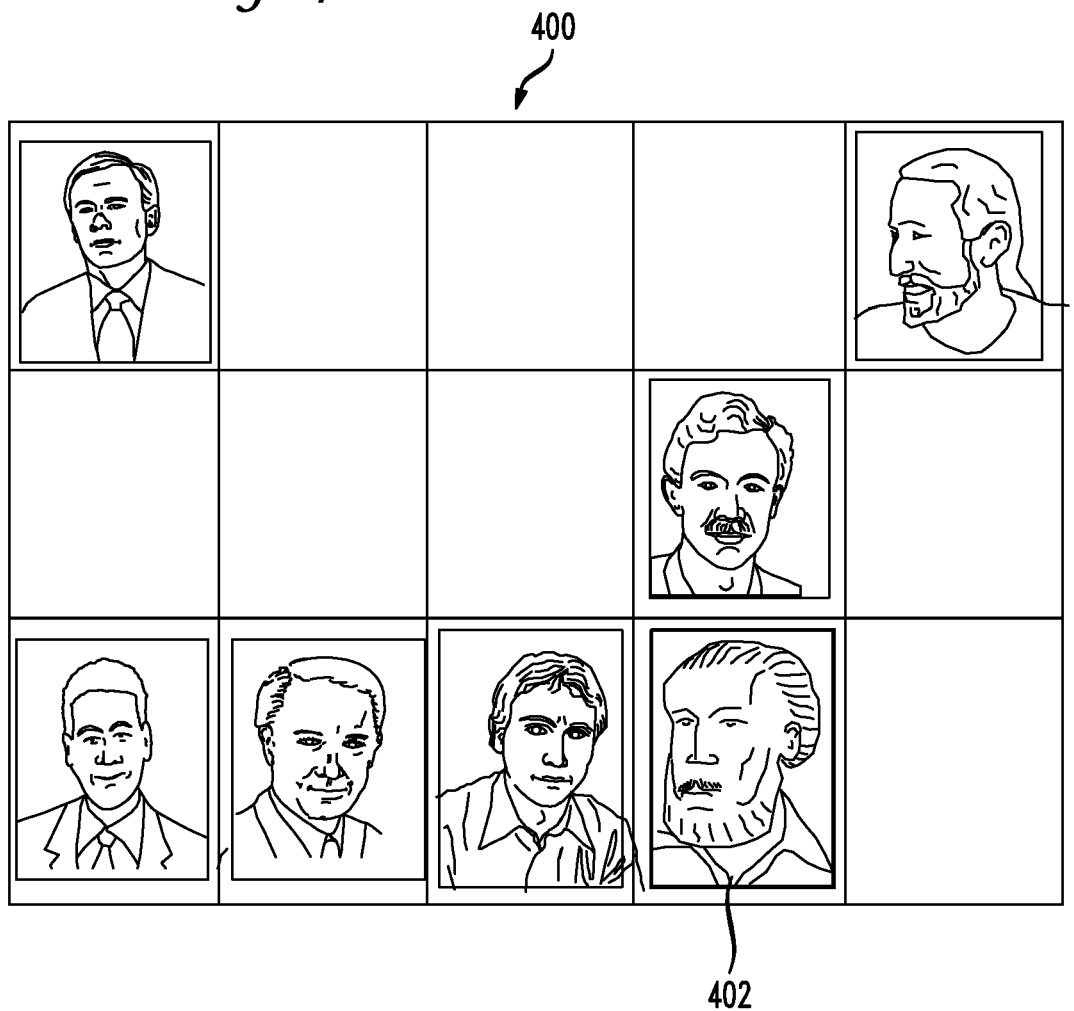
FIG. 4 illustrates an example of training data in a people domain.

Having disclosed some fundamental system components, the disclosure turns to the example method embodiment as shown in FIG. 2. For the sake of simplicity, the example method embodiment is discussed in terms of a system configured to generate natural language. The system first receives domain-specific training data of sentences describing a target entity in a context (202). The concept of the domain-specific training data is to represent many different human-generated descriptions of entities. Naturally each person will describe an entity using different words, refer to different objects surrounding the entity, and base a description on different entity traits. One goal of the method is to synthesize the information stored in a body of training data to identify an optimal way to unambiguously describe an entity in context. One example of domain-specific training data is the TUNA data set. The TUNA data set is a corpus of training data constructed via a web-based experiment. During the experiment, participants were presented with a sequence of web pages, on each of which they saw displayed a selection of 7 pictures of either a furniture domain, see FIG. 3, or a people domain, see FIG. 4, sparsely placed on a 3 row by 5 column grid, 300, 400. The experiment highlighted one of the pictures as a target picture 302, 402 surrounded by 6 randomly selected distracter objects. Experiment participants were told that they were interacting with a computer system with the objective of removing all but the highlighted picture from the screen. Participants entered a description of the object using natural language to identify the target picture on the computer system. In FIG. 3, one example description is "The large red couch on top". In FIG. 4, one example description is "The bald man on the bottom right with a white beard". The TUNA data set is a compilation of the gathered natural language descriptions.

The system can further receive a set of attributes describing the target entity in context. For example, a trainer can develop a more clinical or objective set of attributes for the entity to guide the processing of the domain-specific training data and development of the weighted finite-state automaton. An example set of attributes describing the couch 302 in FIG. 3 are large, upper left, top, and second column. The system can construct the weighted finite-state automaton in such a way to represent the received set of attributes as well as the domain-specific training data.

The system extracts a speaker history and a visual context from the training data (204). The system selects attributes of the target entity based on at least one of the speaker history, the visual context, and speaker preferences (206). The system generates a text expression referring to the target entity based on at least one of the selected attributes, the speaker history, and the context (208). The system can generate referring expressions in at least three ways. The first way uses dependency trees, which represents the syntax of phrases as little trees. The second way uses a permute and order approach which permutes words in all the different possible ways and weights each permutation. The third way is a template-based approach which operates on whole word sequences rather than individual segments or words. The system can generate referring expressions using other approaches as well. In addition, the system can implement each of these approaches differently. For example, the system can use finite-state automata, bools, and/or language models. Finally, the system outputs the generated text expression (210). The system can output the text expression by displaying text such as on a computer screen, by transmitting text such as in an email or text message, and/or audibly with a speech synthesis module.

The system performs surface realization by producing a naturalistic sentence which unequivocally describes the entity in the context based on a set of attributes (attribute selection) describing the entity in a discourse context and a set of examples (training data) of sentence realization from in the specific application domain. This approach can be called dependency-based surface realization. This approach to natural language generation combines parsing techniques, word information, distribution information, and language modeling techniques to better model the human generation process. This approach provides a better generalization and is more robust when trained with large amount of data.

In one set of test results, the best-scoring realization in the weighted finite-state automaton based on training data describing FIG. 3, the system generated "the big red sofa" for the natural language output. In another set of test results describing FIG. 4, the system generated "the man with the white beard". Some examples of non-best scoring realizations in these test results are "on the left red chair with three seats" and "beard man white". While these non-best outputs are not structured like natural language and may sound odd to native English speakers, they unambiguously identify the desired entity.

The system can implement various attribute selection algorithms. Given a set of entities with attributes appropriate to a domain in a discourse context (e.g., cost of flights, author of a book, color of a car) and a target entity that the system need to identify, attribute selection selects one or more subsets of the attributes that uniquely identifies the target entity, that is brief, and that is "humanlike", or similar to those produced by humans.

Two different attribute selection algorithms are the Full Brevity algorithm (FB) (Dale and Reiter, 1995), and the Dale and Reiter algorithm (DR) (Dale and Reiter, 1995). A third attribute selection algorithm is the Visual Search algorithm (VS). FB selects the attribute set by exhaustively searching through all possible attribute sets. In contrast DR orders the attributes based on human preference and selects the attributes in that order until the target entity is uniquely determined. VS orders the attributes based on the arrangement of entities in the visual space, and on human preferences.

In one variation, FB first constructs AS, the set of attribute sets that uniquely identify the referent given the distracters. Then, FB selects an attribute set $AS_u \in AS$ based on different selection criteria. The minimality (FB-m) criterion selects from among the smallest elements of $AS_u$ at random. The frequency (FB-f) criterion selects from among the elements of $AS_u$ the one that occurred most often in the training data. The speaker frequency (FB-sf) criterion selects from among the elements of $AS_u$ the one used most often by this speaker in the training data, and backs off to FB-f if necessary. The FB-sf criterion models individual speaking and/or writing style. Finally, the speaker recency (FB-sr) criterion selects from among the elements of $AS_u$ the one used most recently by this speaker in the training data, and backs off to FB-sf if necessary. This criterion models priming where previous uses of a word or phrase influence future similar uses.

The system uses context such as speaker history, speaker preferences, and visual context to improve attribute selection and realization for referring expression generation. Approaches such as speaker frequency, speaker recency, Euclidian and reading distance are all exemplary alternative methods to use context. FB-sf, FB-sr, DR-sf, VS-E, are sample implementations of these methods.

In one aspect, the system links attribute selection to surface realization to generate referring expressions by using the attributes throughout. Three alternative approaches for this are template, dependency, and permute and rank. The system can implement each of these three using finite state automata.

In one variation of DR labeled DR basic (DR-b), the system builds the preferred list of attributes by sorting the most frequently used attributes in the training set. The system keeps separate lists based upon the "+LOC" and "−LOC" conditions (if the condition included "+LOC", the participants were told to refer to the objects by using all the defined attributes including their location on the screen) in and back-off to a global preferred frequency list in case the attributes are not covered in the current list (merge and sort by frequency). Next, the system iterates over the list of preferred attributes and selects the ones that rule out at least one entity in the contrast set until no distractors are left. In another variation of DR labeled DR speaker frequency (DR-sf), the system considers a different preferred list per speaker and backs off to the DR-b preferred list if an attribute has never been observed in the list of the current speaker preferred attributes. Any of these attribute selection algorithms can function without any external knowledge such as taxonomies.

In VS, the system builds the preferred list of attributes by comparing the target entity to its nearest distractors. The system sorts a possible preferred list of attributes by distance to the nearest distractor for which the value of this attribute differs from the target entity's value for this attribute. The system adds these attributes to the output attribute list, and then moves on to the next distractor. In one variation of VS, the "nearest" distractor is the closest one using Euclidean (geometric) distance. In another, the "nearest" distractor is the closest one using reading distance (left-to-right, top-to-bottom).

A surface realizer for referring expression generation transforms a set of attribute-value pairs into a linguistically well-formed expression. In one embodiment, surface realizers are data-driven and involve four stages of processing: (a) lexical choice of words and phrases to realize attribute values, (b) generation of a space of surface realizations (T), (c) ranking the set of realizations using a language model (LM), and (d) selecting the best scoring realization. In general, the best ranking realization (T*) is described as follows:

$$T^* = \text{Bestpath}(\text{Rank}(T, LM)) \qquad \text{Equation 1}$$

At least three different methods exist to create the space of surface realizations: template-based, dependency-based and permutation-based methods. All three share the same method for ranking the space of surface realizations. They differ in how they generate the space of possible surface realizations. In order to transform the set of attribute-value pairs into a linguistically well-formed expression, the system selects appropriate words that realize each attribute value (lexical choice) and orders the selected words according to the syntax of the target language (lexical order). Different models can approximate the syntax of the target language. All three models can tightly integrate the steps of lexical choice and lexical reordering.

In the first template-based approach, the system infers a set of templates using surface realizations from the training data, such as the TUNA data set described above. The system indexes these templates by the set of attributes they realize. For the TUNA data set, the system extracts the annotated word string from each trial in the training data and replaces each annotated text segment with the attribute type with which it is annotated to create a template. The system accesses each template using the lexicographically sorted list of attribute types each contains. If the system does not find an attribute set in the training data but a superset of that set is found, then the system can use the corresponding template(s) with the un-filled attribute types deleted prior to output.

At generation time, the system finds all possible realizations (l) from the training data of each attribute value (a) in the input attribute set (AS), and fills in each possible template (t) with each combination of the attribute realizations. The system represents the space of possible surface realizations as a weighted finite-state automaton. The system computes weights from the prior probability of each template and the prior probability of each lexical item realizing an attribute as follows:

$$P(T \mid AS) = \sum_{t} P(t \mid AS) * \prod_{a \in t} \sum_{l} P(l \mid a, t) \qquad \text{Equation 2}$$

This realizer can be implemented in two versions, one with speaker-specific lexicons and templates (Template-S) and one without (Template).

In the second dependency-based approach, the system first parses all the word strings from the training data using the dependency parser. Then, for every pair of words $w_i$, $w_j$ that occur in the same referring expression (RE) in the training data, the system computes (1) freq(i<j), the frequency with which $w_i$ precedes $w_j$ in any RE, (2) freq(dep($w_i$, $w_j$) && i<j), the frequency with which $w_i$ depends on and precedes $w_j$ in any RE, and (3) freq(dep($w_i$, $w_j$) && j<i), the frequency with which $w_i$ depends on and follows $w_j$ in any RE.

At generation time, the system finds all possible realizations of each attribute value in the input attribute set, and for each combination of attribute realizations, the system finds the most likely set of dependencies and precedences given the training data. In other words, the system sorts the selected attribute realizations according to whether they are most likely to precede, depend on and precede, depend on and follow, or follow, the closest associated head word. The system thereby generates a set of weighted partial orderings of the attribute realizations. As with the template-based surface realizer, the system can implement speaker-specific or speaker-independent versions of the dependency based surface realizer. Once again, the system encodes the space of possible surface realizers as a weighted finite-state automaton.

In the third permute and rank approach, the system treats the lexical items associated with each attribute value to be realized as a disjunctive set of tokens. This disjunctive set is represented as a finite-state automaton with two terminal states and transitions between them labeled with the tokens of the set. The system weights the transitions by the negative logarithm of the probability of the lexical token (l) being associated with that attribute value (a): $-\log(P(l \mid a))$. The system treats these sets as bags of tokens and further creates permutations of these bags of tokens to represent the set of possible surface realizations. In general, the number of states of the minimal permutation automaton of even a linear automaton (a finite-state machine representation of a string) grows exponentially with the number of words of the string. Although creating the full permutation automaton for full machine translation and natural language generation tasks can be computationally prohibitive, most attribute sets in the two domains in the TUNA data set contain no more than five attributes. Many real-life implementations would be similarly constrained. In these situations, the system can explore the full permutation space. A more general approach might require limited permutations within a local window of adjustable size.

Figure 5:
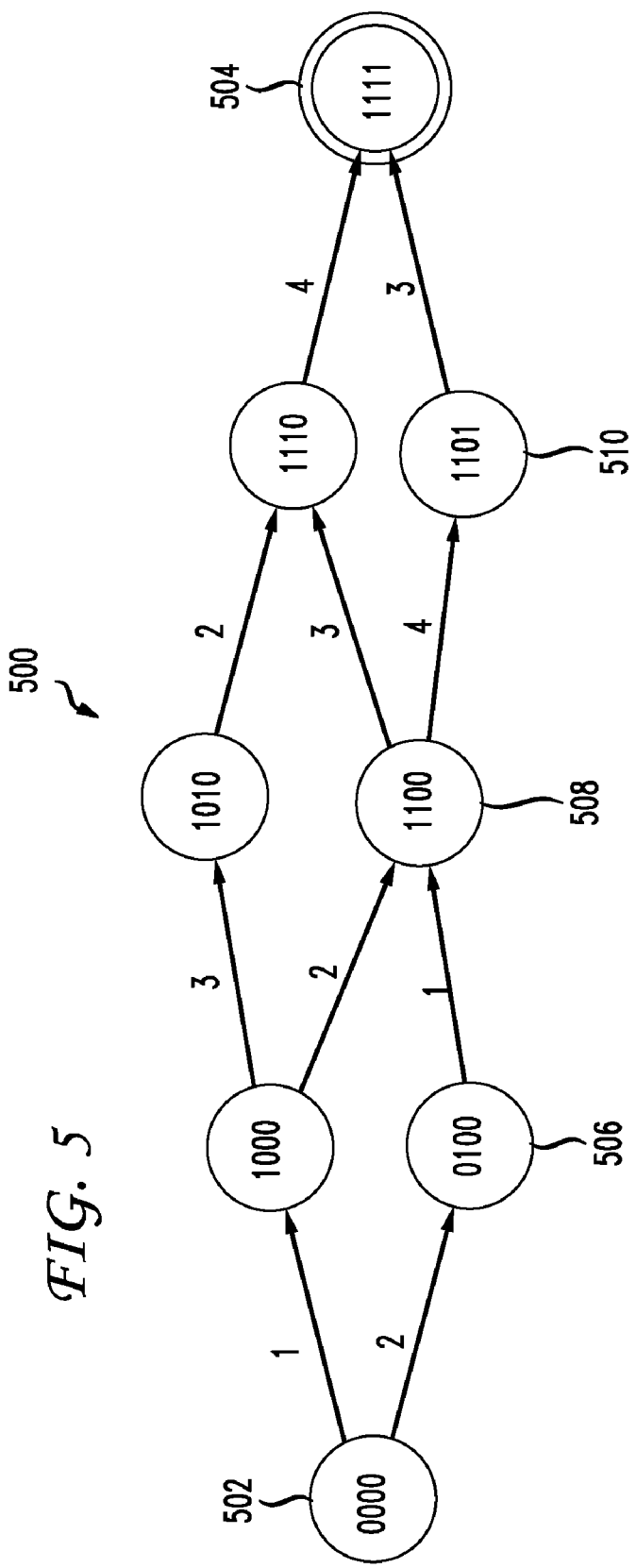
FIG. 5 illustrates a weighted finite-state automaton representing partial orderings of word pairs.

FIG. 5 illustrates a resulting minimal permutation weighted finite-state automaton representing partial orderings of word pairs for an input sequence of 4 words and a window size of 2. Each state 502, 504, 506, 508, 510 of the automaton 500 is indexed by a bit vector of size equal to the number of words/phrases of the target sentence. The system sets each bit of the bit vector to one if the word/phrase in that bit position is used on any path from the initial state to the current state, 502 to 506, 506 to 508, 508 to 510, and 510 to 504. The next word for permutation from a given state is restricted by the window size (2 in this case) positions counting from the first uncovered position in that state. The window size effectively restricts the number of possible branches at each state in the finite state automaton. The window size of 2 in this case means that no state can have more than two possibilities. For example, the state indexed with vector "1000" 506 represents the fact that the word/phrase at position 1 has been used. The next two positions are the possible outgoing arcs from this state 506 with labels 2 and 3 connecting to state "1100" and "1010" respectively 508. The bit vectors of two states connected by an arc differ only by a single bit. Because states with the same bit vectors can be merged, bit vectors elegantly solve the problem of recombining paths in the automaton. As a result, a fully minimized permutation automaton has only a single initial 502 and final state 504.

These three methods for surface realization create a space of possible linguistic expressions given the set of attributes to be realized. The system encodes these expressions as finite-state automata and ranks these expressions based on their syntactic well-formedness. The system approximates an expression's syntactic well-formedness using the n-gram likelihood score of that expression. The system can use a trigram model trained on the realizations in the training corpus. A weighted finite-state automaton can represent this language model. The system merges the automata representing the space of possible realizations and the language model to obtain an automaton that ranks possible realizations according to n-gram likelihood scores. The system can then find a best-scoring realization as the target realization of the input attribute set. A parameter λ allows the system to control the importance of the prior score relative to the language model scores by weighting the finite-state automata according to λ as follows:

$$T^* = \text{Bestpath}(\lambda * T \cdot (1-\lambda) * LM) \qquad \text{Equation 3}$$

When building computational models of language, knowledge about the factors that influence human language production can be very helpful. The approach described herein can incorporate this knowledge in frequentist and heuristic approaches as constraints or features. Individual speaking styles can be usefully modeled even for small generation tasks. The disclosed data-driven approach to surface realization can operate based on a range of lexical, syntactic and semantic information.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein are applicable to nearly any network-enabled device, mobile or non-mobile, which includes a microphone for recording user speech. Some examples of such devices are desktop and laptop computers, set-top boxes, video game consoles, smart phones, and GPS systems. Those skilled in the art will readily recognize various modifications and changes that may be made to the present invention without following the example embodiments and applications illustrated and described herein, and without departing from the true spirit and scope of the present invention.

We claim:

1. A method comprising:
   receiving domain-specific training data of sentences describing a target entity in a context;
   extracting a speaker history and a visual context from the domain-specific training data;
   selecting attributes of the target entity based on at least one of the speaker history, the visual context, and speaker preferences;
   generating a text expression referring to the target entity based on at least one of the attributes, the speaker history, and the context; and
   outputting, via a processor, the text expression.

2. The method of claim 1, wherein generating the text expression is further based on a dependency tree model.

3. The method of claim 2, further comprising generating parsed word strings containing word pairs from the domain-specific training data.

4. The method of claim 1, wherein generating the text expression is further based on a permute and order model.

5. The method of claim 1, wherein generating the text expression is further based on a template-based model.

6. The method of claim 1, wherein generating the text expression is further based on a best-scoring realization.

7. The method of claim 1, wherein a weighted finite-state automaton represents partial orderings of word pairs in the domain-specific training data.

8. The method of claim 7, further comprising receiving a set of attributes describing the target entity in context, wherein a weighted finite-state automaton represents the set of attributes.

9. The method of claim 7, wherein the weighted finite-state automaton comprises a set of weighted partial orderings of the domain-specific training data for each possible realization.

10. The method of claim 7, wherein the weighted finite-state automaton is generated by computing frequencies for how often a first word precedes a second word in any training data sentence, how often the first word depends on and precedes the second word, and how often the first word depends on and follows the second word.

11. A system comprising:
    a processor; and
    a memory having stored therein instructions for controlling the processor to perform a method comprising:
        receiving domain-specific training data of sentences describing a target entity in a context;
        extracting a speaker history and a visual context from the domain-specific training data;
        selecting attributes of the target entity based on at least one of the speaker history, the visual context, and speaker preferences;
        generating a text expression referring to the target entity based on at least one of the attributes, the speaker history, and the context; and
        outputting the text expression.

12. The system of claim 11, wherein the generating the text expression is further based on a dependency tree model.

13. The system of claim 12, further comprising generating parsed word strings containing word pairs from the domain-specific training data.

14. The system of claim 11, wherein generating the text expression is further based on a permute and order model.

15. The system of claim 11, wherein generating the text expression is further based on a template-based model.

16. A non-transitory computer-readable medium having stored therein instructions which, when executed by a computing device, cause the computing device to perform a method comprising:
    receiving domain-specific training data of sentences describing a target entity in a context;
    extracting a speaker history and a visual context from the domain-specific training data;
    selecting attributes of the target entity based on at least one of the speaker history, the visual context, and speaker preferences;
    generating a text expression referring to the target entity based on at least one of the attributes, the speaker history, and the context; and
    outputting the text expression.

17. The non-transitory computer-readable medium of claim 16, wherein generating the text expression is further based on a dependency tree model.

18. The non-transitory computer-readable medium of claim 17, the method further comprising generating parsed word strings containing word pairs from the domain-specific training data.

19. The non-transitory computer-readable medium of claim 16, wherein generating the text expression is further based on a permute and order model.

20. The non-transitory computer-readable medium of claim 16, wherein generating the text expression is further based on a template-based model.

* * * * *